United States Patent Office 3,196,190
Patented July 20, 1965

3,196,190
FLAME-RESISTANT POLYESTER RESINOUS COMPOSITIONS CONTAINING HALOGEN AND PHOSPHORUS
Günther Nischk, Ulrich Bahr, and Karlheinz Andres, Leverkusen, Germany, assignors to Farbenfabriken Bayer Aktiengesellschaft, Leverkusen, Germany, a German corporation
No Drawing. Filed July 13, 1960, Ser. No. 42,473
Claims priority, application Germany, July 17, 1959, F 28,963
19 Claims. (Cl. 260—869)

The present invention relates to flame resistant polyester resinous compositions containing halogen and phosphorus, and more especially to copolymerisable mixtures of olefinically unsaturated polyesters and polymerisable monomers containing a $CH_2=C$-group, said mixtures comprising components containing combined halogens and phosphorus.

In order to produce flame-proofness of compositions containing olefinically unsaturated polyesters and vinylidene monomers incombustible products such as for example trichloroethyl phosphate, antimony trioxide or antimonous acid esters have for example been added thereto. It is true that the copolymers produced from such a composition are thereby made difficult to ignite, but such added substances in these cases are not incorporated chemically into the copolymers but they act as plasticising components. Consequently, the mechanical properties of such copolymers are poor or even their physiological properties are unfavourable due to such added substances.

On the other hand, halogenous components, such as for example tetrachlorphthalic acid, 1,4,5,6,7,7-hexachlor-(2,2,1)-bicyclo-hept-5-ene-2,3-dicarboxylic acid, pentachlorophenyl-glycerine ether, 4,4'-(dihydroxyethoxy)-3,3',5,5'-(tetrachlor)-diphenyl dimethyl methane, 4,5-dibromocyclohexane-1,2-dicarboxylic acid and others can be introduced into the unsaturated polyesters. In these cases, however, very large quantities of these acids or glycols are necessary to produce products which can only be ignited with difficulty. As a result, however, the property diagram of the resulting plastics, more especially the mechanical behaviour, is disadvantageously influenced. In addition, the flame-resistance of these products is inadequate for many purposes.

Groups containing phosphorus have also been incorporated into unsaturated polyesters. Such products are for example obtainable by reacting short-chain unsaturated polyesters with $POCl_3$ or $PCl_3$. Furthermore, unsaturated polyesters which are formed by trans-esterifying trialkyl phosphites or phosphates with unsaturated short-chain polyesters have already been described.

All these polyesters containing phosphorus either have poor mechanical properties or they have not been introduced for practical use owing to their low flame-proof properties.

It has now been found that the aforesaid disadvantages can be avoided if, for the production of copolymers from α,β-unsaturated polyesters and vinyl compounds, there are used polyesters which contain, incorporated therein by condensation, on the one hand a halogen-containing polycarboxylic acid or a halogen containing polyhydric alcohol and, on the other hand, a phosphorus compound of the general formulae

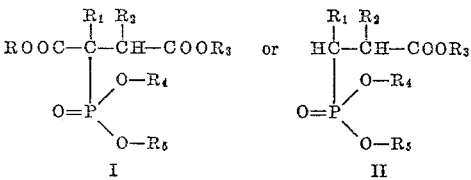

In these formulae, R represents an aliphatic hydrocarbon radical which may be saturated or not and further may be branched or not, or a cycloaliphatic hydrocarbon radical, said hydrocarbon radicals containing 1–20, preferably 1–6 carbon-atoms. R further may be a radical which is derived from aforesaid radicals by substitution of one or more hydrogen atoms by halogen, as chlorine, bromine or fluorine or by a hydroxyl group. Specific examples for the radical R are methyl-, ethyl-, propyl- butyl-, chloroethyl-, bromoethyl-, β-hydroxyethyl-, γ-hydroxybutyl-, β- or γ-hydroxypropyl-, β-hydroxy-ethoxy- ethyl, α-methyl-γ-hydroxypropyl-, β-hydroxy-isopropyl- radical. The radicals $R_1$ and $R_2$ each represent hydrogen or a halogen atom, as for example chlorine, bromine or fluorine or an aliphatic hydrocarbon radical which may be saturated or not and further may be branched or not, or a cycloaliphatic hydrocarbon radical, said hydrocarbon radicals containing 1–20, preferably 1–6 carbon-atoms. The radicals $R_1$ and $R_2$ may be identical or not. The radicals $R_3$, $R_4$ and $R_5$, which may be identical or not, each represent an aliphatic hydrocarbon radical which may be saturated or not and further may be branched or not, or cycloaliphatic hydrocarbon radical, said hydrocarbon radicals containing 1–20, preferably 1–6 carbon-atoms. $R_3$, $R_4$ and $R_5$ further may be radicals which are derived from aforesaid radicals by substitution of one or more hydrogen atoms by halogen atoms, such as bromine, chlorine, fluorine. Further these radicals may be araliphatic radicals, halogenated or not as for example benzyl- or pentachlorobenzyl-radical. Examples of radicals $R_3$, $R_4$ and $R_5$ are methyl-, ethyl-, propyl-, butyl-, chloroethyl-, bromopropyl-, dichloropropyl-, allyl-, methallyl-, benzyl radicals. Furthermore, R may also stand for an araliphatic radical such as benzyl, which may be halogenated.

The compounds according to Formula I containing phosphorus and to be used according to the invention are obtained in simple manner if phosphites of the general formula

are reacted with semi-esters of α,β-unsaturated dicarboxylic acids. In the above Formula III, $R_3$, $R_4$ and $R_5$ have the same meaning as disclosed above.

Catalysts are not necessary in this case, presupposition however is the presence of a free carboxyl group, i.e. employment of a semi-ester.

Examples of trialkyl and triaralkyl phosphites which are suitable for the process of the invention are trimethyl phosphite, triethyl phosphite, tributyl phosphite, tri-β- chlorethyl phosphite, tri-γ-bromopropyl-phosphite, tri- allyl phosphite, trimethallyl phosphite, tribenzyl phosphite, tri-(pentachlorobenzyl)-phosphite, diallyl methyl phosphite and dibenzyl-β-chloroethyl phosphite.

Suitable semi-esters of α,β-unsaturated dicarboxylic acids are for example the semi-esters of maleic, fumaric, methylmaleic, chloromaleic, bromomaleic, dichloromaleic, methylene succinic and glutaconic acids with monohydric saturated or unsaturated aliphatic alcohols having preferably 1–6 carbon atoms, or with monohydric cycloalphatic alcohols (such as cyclohexanol) or with monohydric araliphatic alcohols (such as benzyl alcohol) which alcohols may be substituted by halogen atoms such as chlorine, bromine, fluorine. Particularly important are the semi-esters of maleic acid and its substitution products, since their semi-esters are formed very easily from the corresponding acid anhydrides and alcohols by opening of the ring. Maleic monomethyl ester, maleic monoallyl ester, methyl maleic monochloroethyl ester, chloromaleic monobenzyl ester are particularly suitable.

Furthermore, it is also possible to use semi-esters of the aforementioned dicarboxylic acids with polyhydric, preferably dihydric alcohols which semi-esters contain free hydroxyl groups. These are prepared by reacting the polyhydric alcohol with less than the equivalent quantity, based on the OH-groups of the polyhydric alcohol, of dicarboxylic acid anhydride. Suitable polyhydric alcohols are for instance glycol, propylene glycol, butylene glycol, hexanediol, diethylene glycol. An example of such a semi-ester is the ethylene glycol monochloromaleinate of the formula

and 1,4-butylene-glycol monomaleinate.

For the preparation of the said phosphorus compounds the trialkyl or triaralkyl phosphites are reacted with the semi-esters of $\alpha,\beta$-unsaturated dicarboxylic acids at room temperature or elevated temperature. With very reactive substances, temperatures in the range of 0° C. can be used with success while on the other hand, with compounds which are less reactive and are simultaneously stable, require temperatures in the region of 200° C. Since the addition reaction is strongly exothermic, it is advisable for one component to be added to the other in small portions. The reaction can also take place in the presence of solvents such as benzene, toluene, chloroform or dioxane.

Semi-esters containing the semi-ester grouping only once with the $\alpha,\beta$-unsaturated group are preferably reacted with the equimolar quantity of trialkyl or triaralkyl phosphites. There are then obtained neutral products or products with a very low acid number. These addition products are derivatives of substituted alkyl phosphonic acid esters.

In all reactions, the addition products are produced with a substantially quantitative yield and in most cases constitute colourless to light yellow oils, which show low acid numbers and, when using semi-esters containing hydroxyl groups, have characteristic hydroxyl numbers.

In quite an analogous manner, the reaction of the phosphites of Formula III with $\alpha,\beta$-unsaturated monocarboxylic acids, such as acrylic acid, methacrylic acid, crotonic acid leads to substances of the general Formula II.

The unsaturated polyesters to be considered for the present process contain halogen, i.e. both the acid component and the glycol component can operate as halogen carrier.

As $\alpha,\beta$-unsaturated dicarboxylic acids to be used for the preparation of said polyesters there are mentioned by way of example maleic acid, chloromaleic acid, dichloromaleic acid, fumaric acid, bromofumaric acid, itaconic acid, citraconic acid, mesaconic acid and also the anhydrides of maleic acid or substituted maleic acid. These acids or their anhydrides should be present in amounts not less than 20 mol-percent as calculated on the total amount of the dicarboxylic acids employed.

Aliphatic or aromatic dicarboxylic acids which contain no polymerisable double bond such as succinic acid, adipic acid, sebacic acid, phthalic acid, terephthalic acid in addition to said unsaturated acids can be used. Dicarboxylic acids of this type also may contain halogen atoms. From the large number of the halogen-containing dicarboxylic acids under consideration, there are especially to be emphasised dichlorophthalic acid, dibromisophthalic acid, tetrachlorphthalic acid, dibromoterephthalic acid, 3,5-dibromobenzoic acid, 4,5-dibromohexahydrophthalic acid, trichloracrylic acid and 1,4,5,6,7,7-hexachlor-2,2,1-bicyclohept-5-ene-2,3-dicarboxylic acid. These dicarboxylic acids may be present in amounts between 0 and 80 mol-percent, calculated on the total amount of dicarboxylic acids employed in preparation of the polyester.

As regards the polyhydric alcohols to be used for the preparation of the polyesters, it is possible to employ glycol, diethylene glycol, tetraethylene glycol, propane-1,2-diol, butane-1,3-diol trimethylolpropane, and also halogenated alcohols such as pentachlorophenyl glycerine ether, pentachlorophenyl monoglycol ether, 4,4'-(dihydroxyethoxy)-3,3'-5,5'-(tetrachloro)diphenyl dimethyl methane or trichloroethyl alcohol, hexachloroendomethylene-tetrahydro benzyl alcohol prepared from hexachlorocyclopentadiene and allylalcohol.

The unsaturated polyesters are prepared in a manner known per se by conventional esterification methods (see German Patent No. 967,265). The ratio dicarboxylic acid to glycol should be of such a kind, that about equimolar quantities of hydroxyl equivalents are present per carboxylic equivalents. Preferably a slight excess of hydroxyl-group of about 10 percent may be present.

In a preferred embodiment, the condensation of the components is carried out at temperatures between 150 and 230° C., if necessary under an atmosphere of inert gases, as for example nitrogen or carbon dioxide and the reaction is completed in vacuo.

The adducts containing phosphorus corresponding to Formulae I or II and to be used according to the invention can be added at the start, during or towards the end of the polyester formation, it being possible to maintain the esterification conditions, both as regards temperature and time. Particularly favourable results are obtained in the last-mentioned case, i.e., when the phosphorus-containing component is added at the end of the polyester formation, since in this case no saponification can be initiated on the phosphonic acid ester radical by quantities of water which originate from the esterification reaction. These intermediate polyesters preferably have a molecular weight of 500–3000. The incorporation of the phosphorus-containing components is based on a transesterification with removal of the corresponding alcohol at a carboxyl or phosphoric acid group. The preferred working temperature is at 100 to 200° C., although temperatures up to 250° C. are permissible.

As regards the quantities of phosphorus-containing component to be used, a large range of variation exists and the quantity of phosphorus component to be employed will depend on the required properties of the final product. The amount of phosphorus-containing component should be such one, that the content of phosphorus of the final product, i.e. the copolymerisation product of unsaturated polyester and vinylidene compound, ranges between 0.5–5% by weight, preferably 1–2% by weight. For producing the final polyesters the phosphorus containing adduct may be applied in amounts of 10 to 100% by weight as calculated on the weight of the intermediate polyester.

It is true that the flame-proof qualities of the copolymer increase with a rising halogen content thereof, but combined with this is a considerable fall in the mechanical quality. The lowest limit of the halogen content is at about 5%, the upper limit about 35%, preferably are employed halogen contents of 15–25%, all percent by weight, calculated on the amount of the final copolymer.

The vinyl or allyl monomers which can be copolymerized with the aforesaid unsaturated polyesters can be free from halogen, such as for example styrene, methyl styrene, divinyl benzene, vinyl toluene, diallyl phthalate, triallyl cyanurate, vinyl acetate, acrylic acid or methacrylic acid esters. The copolymerisable vinyl or allyl components can however also function, at least in part, as halogen carriers. Mentioned as examples for this purpose are nuclear-halogenated styrenes, tetrachlorophthalic diallyl ester, pentachlorophenyl acrylate or trichloracetic acid allyl ester. Such monomers are preferred which are normally liquid and have a boiling point of at least 50° C.

The unsaturated phosphorus-containing polyester prepared from the components indicated above are thereafter copolymerised with vinyl and/or allyl derivatives in known manner at room temperature or elevated temperature. The ratio unsaturated polyester to vinyl monomer is within the limits 9:1 to 1:1 parts by weight. Preferably a ratio from 4:1 to 6.5:1.5 is employed. The reaction temperature is given by the temperature, whereby the catalyst decomposes, in most cases temperatures between 60–140° C. are used. It is possible for this purpose to consider conventional polymerisation catalysts such as peroxides, for example benzoyl peroxide, methylethyl-keton-peroxide, cumene hydroperoxide, tert, butyl-peroxide or azo compounds, for example azodiisobutyric acid dinitrile. Moreover, also cold-hardening catalyst systems may be used, i.e. catalyst systems which allow polymerisation at room temperature, as for example benzoyl peroxide or p-chloro-benzoyl-peroxide in combination with tertiary amines as for example triethylamine, diethyl-aniline or substituted hydrazines and the like or organic metal compounds, such as metal salt driers (cobalt naphthenate, cobalt octoate).

By the simultaneous use according to the invention of the one hand of halogenated carboxylic acids or halogenated alcohols, if necessary also halogenated vinyl compounds, and on the other hand of the previously defined phosphorus components, it now becomes possible to manufacture plastics which are not only highly flameproof, but at the same time have not experienced any deterioration in their mechanical properties. The concurrent use of the phosphorus-containing components also enables the proportion of halogen-containing glycols or acids to be considerably reduced while maintaining the same flame-proofing properties, and in this way offers other economic advantages.

The compositions of the invention can be used either for the production of moulded elements, coatings or as impregnating material or, in combination with fillers or fibrous materials such as glass fibres, jute, asbestos, synthetic fibres and the like, for the production of laminates.

The following data as regards flame test relate in each case to a test element with the dimensions 0.1 x 1.5 x 12 cm., which contains about 30% glass fibre matting. The testing of the flame resistance of a plastic is substantially more sensitive when using test elements having incorporated glass fibres than with test elements without glass fibres. The test element is introduced into a Bunsen flame with a height of 30 cm. and with a flame core having a height of 9 cm., so that the flame core is spaced 6 cm. from the outer edge of the test element.

In the following examples the parts indicated are parts by weight, unless otherwise mentioned.

EXAMPLE 1

980 parts of maleic anhydride and 900 parts of 1,3-butylene glycol are heated for 15 minutes to 120–125° C. 1,3-butylene glycol monomaleinate is formed in an exothermic reaction. The temperature is then lowered to 60° C. and 2700 parts of tri-β-chlorethyl phosphite are introduced dropwise while stirring. The temperature rises according to the speed of addition and the latter is regulated in such a manner that the temperature does not exceed 90° C. After completing the addition, the mixture is stirred for another hour. A light yellow oil is obtained which has the acid number 12.

98 parts of maleic anhydride and 286 parts of tetrachlorophthalic anhydride are heated with 135 parts of ethylene glycol at 190–195° C. while passing over carbon dioxide until the water formed by condensation has substantially distilled off. Vacuum is thereafter gradually applied until about 30 mm. Hg is reached and then heating is continued for another 2 hours. The temperature is then allowed to fall to 130° C. and 230 parts of the previously described phosphorus adduct are added. The mixture is then heated again to 190° C., kept for 1 hour at this temperature and the forming glycol chlorhydrin is then distilled off in vacuo to a quantity of 40 parts. 30 parts of styrene and 0.02 part of hydroquinone are added to 70 parts of the polyester. The curing of the mixture can be effected with 3% benzoyl peroxide paste (50% in dimethyl phthalate) at 100° C. The copolymer thus obtained shows the following properties:

Mechanical properties

| | |
|---|---|
| Bending strength _____kg./cm.$^2$__ | 1455 |
| Bending angle _____degrees__ | 14 |
| Impact toughness _____cm. kg./cm.$^2$__ | 3.3 |
| Brinell hardness: | |
| 10 sec. _____kg./cm.$^2$__ | 1965 |
| 60 sec. _____kg./cm.$^2$__ | 1850 |
| Martens (dimensional stability under heat according to Martens) _____degrees__ | 72 |
| Smouldering time after flame action for 15 seconds _____sec__ | 3 |

EXAMPLE 2

148 parts of maleic anhydride, 80 parts of ethylene glycol, 134 parts of trimethylol propane and 180 parts of trichloracrylic acid are condensed as disclosed in Example 1 to form a polyester. A total of 430 parts of an addition product obtained by adding 270 parts of trichlorethyl phosphite to 160 parts of maleic monoglycol ester (see also Example 4) is added thereto at 140° C. and the mixture is stirred for 1 hour at 180° C. The condensation is continued under a vacuum of 30 mm. Hg until altogether 80 parts of glycol chlorhydrin have transferred to the distillation receiver.

0.25 part of hydroquinone and 365 parts of p-chlorostyrene are added at 130° C. for copolymerisation. The prepared mixture is polymerised at 90° C. with 2% benzoyl peroxide. A practically colourless copolymer is formed, which has the following mechanical properties:

Mechanical strength values

| | |
|---|---|
| Bending strength _____kg./cm.$^2$__ | 1100 |
| Brinell hardness, 10 sec. _____kg./cm.$^2$__ | 1450 |
| Impact toughness _____kg./cm.$^2$__ | 2.7 |
| Degrees Martens _____° C__ | 65 |
| Smouldering time after flame action for 15 seconds _____sec__ | 3 |

EXAMPLE 3

196 parts of maleic anhydride, 88 parts of adipic acid, 400 parts of tetrachlorophthalic anhydride and 270 parts of ethylene glycol are heated gradually to 198° C. while passing over carbon dioxide and while stirring. Water is violently split off at 150° C. After the water has substantially distilled off, condensation is continued for another 2 hours under a vacuum of 25 mm. Hg. The polyester formed is then cooled to 140° C. and 460 parts of the phosphorus-containing adduct described in Example 1 are added. The mixture is thereafter heated again for 1 hour at 190° C. and some glycol chlorhydrin already distils over. The residue of chlorhydrin which still remains after about 80 parts thereof have been distilled off is removed in vacuo and then the temperature is lowered to 120° C.

70 parts of the polyester prepared in this manner are thoroughly stirred with 30 parts of styrene and 0.02 part of hydroquinone and thereafter polymerised at 100° C. with 2% benzoyl peroxide. The properties of a copolymer prepared in this way are as follows:

Mechanical strength values

| | |
|---|---|
| Bending strength _____kg./cm.$^2$__ | 1562 |
| Bending angle _____degrees__ | 19 |
| Toughness _____cm. kg./cm.$^2$__ | 83 |
| Brinell hardness: | |
| 10 sec. _____kg./cm.$^2$__ | 1860 |
| 60 sec. _____kg./cm.$^2$__ | 1750 |
| Degrees Martens _____° C__ | 70 |
| Smouldering time after flame action for 15 seconds _____sec__ | 6 |

EXAMPLE 4

2700 parts of trichlorethyl phosphite are added at 70°

C. to 1600 parts of maleic monoglycol ester. With heat of reaction, the phosphonic acid ester is formed, this being light yellow in colour. 116 parts of fumaric acid, 312 parts of 4,5-dibromohexahydrophthalic acid anhydride and 140 parts of ethylene glycol are initially condensed as described in Example 1 at 180° C. to form a polyester containing hydroxyl groups. 432 parts of the alcohol as just described and containing phosphorus are added at 130° C. Heating is continued to 180° C., glycol chlorhydrin distilling off. Altogether, 80 parts of glycol chlorhydrin should distil over. Towards the end of this reaction, a vacuum of 30 mm. Hg is used.

70 parts of this polyester are taken up in 30 parts of styrene and mixed with 0.04 part of tertiary butyl pyrocatechol. The properties of the polymer prepared therefrom are as follows:

*Mechanical strength values*

| | |
|---|---|
| Bending strength _____ kg./cm.$^2$ __ | 874 |
| Bending angle _____ degrees __ | 26 |
| Toughness _____ cm. kg./cm.$^2$ __ | 2.2 |
| Brinell hardness: | |
|    10 sec. _____ kg./cm.$^2$ __ | 1440 |
|    60 sec. _____ kg./cm.$^2$ __ | 1350 |
| Degrees Martens _____ ° C __ | 49 |
| Smouldering time after flame action for 15 seconds _____ sec __ | 1 |

EXAMPLE 5

98 parts of maleic anhydride and 156 parts of 4,5-dibromohexahydrophthalic acid anhydride are esterified with 115 parts of ethylene glycol in accordance with the data given in Example 4 and thereafter reacted with 432 parts of the phosphorus adduct described therein. 70 parts of the polyester are mixed with 30 parts of styrene and 0.02 part of hydroquinone. The properties of the cross-linking product obtained in accordance with the data of Example 4 are:

*Mechanical strength values*

| | |
|---|---|
| Bending strength _____ kg./cm.$^2$ __ | 1108 |
| Bending angle _____ degrees __ | 19 |
| Toughness _____ cm. kg./cm.$^2$ __ | 2.0 |
| Brinell hardness: | |
|    10 secs. _____ kg./cm.$^2$ __ | 1655 |
|    60 secs. _____ kg./cm.$^2$ __ | 1465 |
| Degrees Martens _____ ° C __ | 2 |
| Smouldering time after flame action for 15 seconds _____ secs __ | 53 2 |

EXAMPLE 6

98 parts of maleic anhydride and 371 parts of 1,4,5,6,7,7-hexachlor-2,2,1-bicyclo-hept-5-ene-2,3-dicarboxylic acid, are esterified at 180° C. with 135 parts of ethylene glycol in accordance with the data given in Example 1 and thereafter reacted with 432 parts of the adduct described in Example 4. 30 parts of styrene and 0.02 part of hydroquinone are added to 70 parts of the polyester. The properties of the cross-linking product obtained according to the data of Example 1 are:

*Mechanical strength values*

| | |
|---|---|
| Bending strength _____ kg./cm.$^2$ __ | 1114 |
| Bending angle _____ degrees __ | 17 |
| Toughness _____ cm. kg./cm.$^2$ __ | 2.6 |
| Brinell hardness: | |
|    10 secs. _____ kg./cm.$^2$ __ | 1740 |
|    60 secs. _____ kg./cm.$^2$ __ | 1600 |
| Degrees Martens _____ ° C __ | 60 |
| Smouldering time after flame action for 15 seconds _____ seconds __ | 2 |

EXAMPLE 7

98 parts of maleic anhydride and 186 parts of 1,4,5,6,7,7-hexachlor-2,2,1-bicyclo-hept-5-ene-2,3-dicarboxylic acid are esterified with 110 parts of ethylene glycol according to the data of Example 1 and thereafter reacted with 330 parts of the adduct described in Example 4. 30 parts of styrene and 0.02 part of hydroquinone are added to 70 parts of the polyester. The properties of the cross-linking product obtained in accordance with the data of Example 1 are:

*Mechanical strength values*

| | |
|---|---|
| Bending strength _____ kg./cm.$^2$ __ | 1280 |
| Bending angle _____ degrees __ | 20 |
| Toughness _____ cm. kg./cm.$^2$ __ | 3.2 |
| Brinell hardness: | |
|    10 secs. _____ kg./cm.$^2$ __ | 1930 |
|    60 secs. _____ kg./cm.$^2$ __ | 1810 |
| Degrees Martens _____ ° C __ | 67 |
| Smouldering time after flame action for 15 seconds _____ secs __ | 3 |

EXAMPLE 8

1600 parts of maleic monoglycol ester are reacted at 60° C. with 4450 parts of tri-β-bromopropyl phosphite. The heat of reaction must also be dissipated here by suitable cooling. A light yellow adduct of oily consistency is obtained.

348 parts of fumaric acid, 327 parts of pentachlorophenyl monoglycerine ether and 140 parts of ethylene glycol are condensed while passing over carbon dioxide at 180° C. to form a polyester containing hydroxyl groups. The temperature is then lowered to 140° C. and 608 parts of the previously described phosphonic acid adduct are added. The temperature is again raised to 180° C. and 135 parts of the 2-bromo-propan-1-ol are distilled off in vacuo.

70 parts of the polyester thus prepared are taken up in 30 parts of styrene and stabilised with 0.03 part of quinhydrone. The polymerisation is carried out by 2 parts of benzoyl peroxide at 90° C. and a copolymer having the following values is obtained:

*Mechanical strength values*

| | |
|---|---|
| Bending strength _____ kg./cm.$^2$ __ | 1080 |
| Bending angle _____ degrees __ | 12 |
| Toughness _____ cm. kg./cm.$^2$ __ | 2.1 |
| Brinell hardness: | |
|    10 secs. _____ kg./cm.$^2$ __ | 1460 |
|    60 secs. _____ kg./cm.$^2$ __ | 1320 |
| Degrees Martens _____ ° C __ | 95 |
| Smouldering time after flame action for 15 seconds _____ sec __ | 1 |

EXAMPLE 9

From 98 parts of maleic anhydride and 120 parts of hexane-1,6-diol, the corresponding maleic acid semi-ester is prepared at 120° C. 124 parts of trimethyl phosphite are then gradually added thereto at 60° while cooling. An almost colourless oily adduct is obtained, which is used for the following experiment.

286 parts of tetrachlorphthalic acid anhydride, 98 parts of maleic anhydride and 140 parts of ethylene glycol are heated to 190° C. while passing over nitrogen and while stirring. When the splitting off of water subsides, vacuum is gradually applied during 2 hours. The temperature is lowered again to 150° C. and 484 parts of the previously described adduct of trimethyl phosphite are added. The temperature is then raised to 180° C. and 65 parts of methanol distil over.

70 parts of the polyester prepared in this way are mixed with 30 parts of styrene and then polymerised with 2 parts of di-tert.butyl peroxide at 120° C. A copolymer is obtained which has the following mechanical properties:

*Mechanical strength values*

| | | |
|---|---|---|
| Bending strength | kg./cm.² | 1520 |
| Bending angle | degrees | 15 |
| Toughness | cm. kg./cm.² | 3.9 |
| Degrees Martens | ° C | 75 |
| Smouldering time after flame action for 15 seconds | secs | 4 |

What we claim is:

1. A flame-resistant composition comprising the polymerisable mixture of (1) an ethylenically unsaturated polyhydric alcohol-polycarboxylic acid polyester containing combined halogen, said polyester having incorporated therein by condensation a phosphorus compound selected from the group consisting of compounds of the formulae

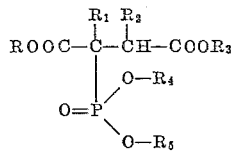

and

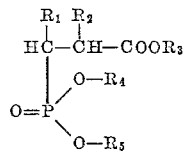

wherein R is selected from the group consisting of alkyl, unsaturated alkyl, cycloalkyl, aralkyl, hydroxyalkyl, halogenated alkyl, halogenated cycloalkyl and halogenated aralkyl; $R_1$ and $R_2$ are selected from the group consisting of hydrogen, alkyl, halogen and cycloalkyl and $R_3$, $R_4$ and $R_5$ are selected from the group consisting of alkyl, unsaturated alkyl, cycloalkyl, aralkyl, halogenated alkyl, halogenated cycloalkyl and halogenated aralkyl and (2) a vinylidene monomer.

2. A flame resistant composition according to claim 1, wherein said polymerisable mixture contains 5–35% by weight of combined halogen and wherein said polyester has incorporated therein said phosphorus compound in an amount corresponding to 0.5–5% by weight of phosphorus as calculated on the weight of the total mixture.

3. A flame resistant composition according to claim 1, wherein said ethylenically unsaturated polyester has condensed therein halogenated carboxyl acids.

4. A flame resistant composition according to claim 1, wherein said ethylenically unsaturated polyester has condensed therein halogenated alcohols.

5. A flame resistant composition comprising the copolymerisation product of (1) an ethylenically unsaturated polyhydric alcohol-polycarboxylic acid polyester containing combined halogen, said polyester having incorporated therein by condensation a phosphorus compound selected from the group consisting of compounds of the formulae

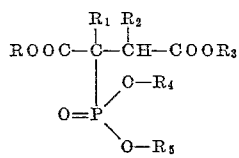

and

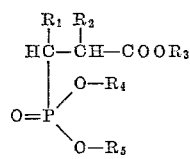

wherein R is selected from the group consisting of alkyl, unsaturated alkyl, cycloalkyl, aralkyl, hydroxyalkyl, halogenated alkyl, halogenated cycloalkyl and halogenated aralkyl; $R_1$ and $R_2$ are selected from the group consisting of hydrogen, alkyl, halogen and cycloalkyl and $R_3$, $R_4$ and $R_5$ are selected from the group consisting of alkyl, unsaturated alkyl, cycloalkyl, aralkyl, halogenated alkyl, halogenated cycloalkyl and halogenated aralkyl and (2) a vinylidene monomer.

6. A flame resistant composition comprising the polymerisable mixture of (1) an ethylenically unsaturated polyhydric alcohol-polycarboxylic acid polyester containing combined halogen, said polyester having incorporated therein by condensation an adduct of about equimolar proportions of a half-ester of an α,β-ethylenically unsaturated dicarboxylic acid and of phosphinic acid tri-ester and (2) a vinylidene monomer.

7. A flame resistant composition according to claim 6, wherein said half-ester is a half-ester of 1 mol of maleic acid and 1 mol of a dihydric alcohol.

8. A flame resistant composition according to claim 6, wherein said phosphinic acid ester is a trialkyl phosphite in which at least one alkyl group is substituted by a halogen atom.

9. An ethylenically unsaturated polyhydric alcohol-polycarboxylic acid polyester containing combined halogen and having incorporated therein by condensation an adduct of equimolar proportions of a half-ester of α,β-ethylenically unsaturated dicarboxylic acid and of a phosphinic acid triester.

10. A process of producing a halogen and phosphorus containing ethylenically unsaturated polyester which comprises condensing an ethylenically unsaturated polyhydric alcohol-polycarboxylic acid polyester containing combined halogen and having a molecular weight of about 500 to 3000 with an adduct of about equimolar proportions of a half-ester of an α,β-unsaturated dicarboxylic acid and of a phosphinic acid triester at a temperature of 100–250° C., said phosphinic acid triester adduct being applied in amounts of 10% to 100% by weight as calculated on the weight of the said polyester.

11. A flame-resistant composition comprising a copolymerizable mixture of (1) a vinylidene monomer and (2) an ethylenically unsaturated polyhydric alcohol-polycarboxylic acid polyester containing combined halogen and having incorporated therein by condensation a compound of the formula:

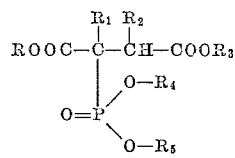

wherein R is selected from the group consisting of alkyl, unsaturated alkyl, cycloalkyl, aralkyl, hydroxyalkyl, halogenated alkyl, halogenated cycloalkyl and halogenated aralkyl; $R_1$ and $R_2$ are selected from the group consisting of hydrogen, alkyl, halogen and cycloalkyl and $R_3$, $R_4$ and $R_5$ are selected from the group consisting of alkyl, unsaturated alkyl, cycloalkyl, aralkyl, halogenated alkyl, halogenated cycloalkyl and halogenated aralkyl.

12. A flame-resistant resinous composition prepared by the polymerization of the copolymerizable mixture of claim 11.

13. A flame-resistant composition comprising a copolymer of (a) styrene and (b) the condensation product of a halogen-containing polyhydric alcohol-polycarboxylic acid polyester with a maleic acid semiester/phosphinic acid triester.

14. The composition of claim 13 wherein the phosphinic triester is tri-beta-chlorethyl phosphite.

15. A flame-resistant resin prepared by reacting (a) a polyester of maleic anhydride, tetrachlorophthalic anhydride and ethylene glycol, with (b) a 1,3-butylene glycol monomaleinate/tri-beta-chloroethyl phosphate reaction product, and (c) styrene.

16. A flame-resistant resin prepared by reacting (a) a polyester of maleic anhydride, ethylene glycol, trimethylol propane, and trichloroacrylic acid, with (b) the addition product of monoglycol maleate and trichloroethyl phosphite, and (c) p-chlorostyrene.

17. A flame-resistant resin prepared by reacting (a) a polyester of maleic anhydride, adipic acid, tetrachlorophthalic anhydride, and ethylene glycol, with (b) a 1,3-butylene glycol monomaleinate/tri-beta-chloroethyl phosphite reaction product, and (c) styrene.

18. A flame-resistant resin prepared by reacting (a) a polyester of fumaric acid, dibromohexahydrophthalic acid anhydride, and ethylene glycol, with (b) a monoglycol maleate/tri-chloroethyl phosphite reaction product, and (c) styrene.

19. A flame-resistant resin prepared by reacting (a) a polyester of maleic anhydride dibromohexahydrophthalic acid anhydride, and ethylene glycol, with (b) a monoglycol maleate/trichloroethyl phosphite reaction product, and (c) styrene.

References Cited by the Examiner
UNITED STATES PATENTS

| | | | |
|---|---|---|---|
| 2,754,319 | 7/56 | Johnson | 260—461 |
| 2,819,247 | 1/58 | Lundberg | 260—866 |
| 2,822,340 | 2/58 | McGovern et al. | 260—869 |
| 2,830,927 | 4/58 | Sallmann | 260—461 |
| 2,875,231 | 2/59 | McConnell et al. | 260—461 |
| 2,877,204 | 3/59 | Duhnkrack et al. | 260—865 |
| 2,931,746 | 4/60 | Robitschek et al. | 260—869 |
| 2,963,458 | 12/60 | Swern | 260—310 |

MURRAY TILLMAN, *Primary Examiner.*

A. D. SULLIVAN, LEON J. BERCOVITZ, DONALD E. CZAJA, *Examiners.*

UNITED STATES PATENT OFFICE
CERTIFICATE OF CORRECTION

Patent No. 3,196,190                                        July 20, 1965

Günther Nischk et al.

It is hereby certified that error appears in the above numbered patent requiring correction and that the said Letters Patent should read as corrected below.

Column 7, line 49, for "2" read -- 53 --; line 50, strike out "53".

Signed and sealed this 15th day of March 1966.

(SEAL)
Attest:

ERNEST W. SWIDER                                    EDWARD J. BRENNER
Attesting Officer                                        Commissioner of Patents